United States Patent
Greer

[11] 3,889,181
[45] June 10, 1975

[54] MAGNETIC SYSTEM FOR DISCRIMINATING BETWEEN VEHICLES AND PERSONNEL BASED UPON THEIR CHARACTERISTIC FREQUENCY SIGNATURES

[75] Inventor: Charles B. Greer, Clifton, Va.

[73] Assignee: United States of America as represented by the Secretary of the Army, Washington, D.C.

[22] Filed: Mar. 8, 1974

[21] Appl. No.: 449,429

[52] U.S. Cl. .............. 324/41; 340/38 L; 340/258 C
[51] Int. Cl. ............................................. G01r 33/00
[58] Field of Search..... 324/41, 43 R; 340/31, 38 R, 340/38 L, 258 R, 258 C

[56] References Cited
UNITED STATES PATENTS

| | | | |
|---|---|---|---|
| 3,343,079 | 9/1967 | Crouch | 324/37 |
| 3,508,238 | 4/1970 | Baker | 340/38 L |
| 3,723,988 | 3/1973 | Updegraff et al. | 340/38 L |
| 3,727,206 | 4/1973 | Kardashian | 340/38 L |
| 3,745,450 | 7/1973 | Geil et al. | 340/258 R |
| 3,754,223 | 8/1973 | Wilt | 340/38 L |
| 3,812,484 | 5/1974 | Shtrikman | 340/38 L |
| | | Miller et al. | 340/38 L |

Primary Examiner—Robert J. Corcoran
Attorney, Agent, or Firm—Robert P. Gibson; Nathan Edelberg

[57] ABSTRACT

An electronic system for the detection of moving objects, such as vehicles or personnel, is disclosed. The system detects the presence of vehicles and personnel by utilization of a characteristic frequency signature of each in a twin channel arrangement with each channel adapted to process signals within its respective frequency band. As vehicles may produce signals within the bandpass of both channels and personnel produce signals within the bandpass of only one channel the system is uniquely adapted to distinguish between the two types of moving objects.

3 Claims, 1 Drawing Figure

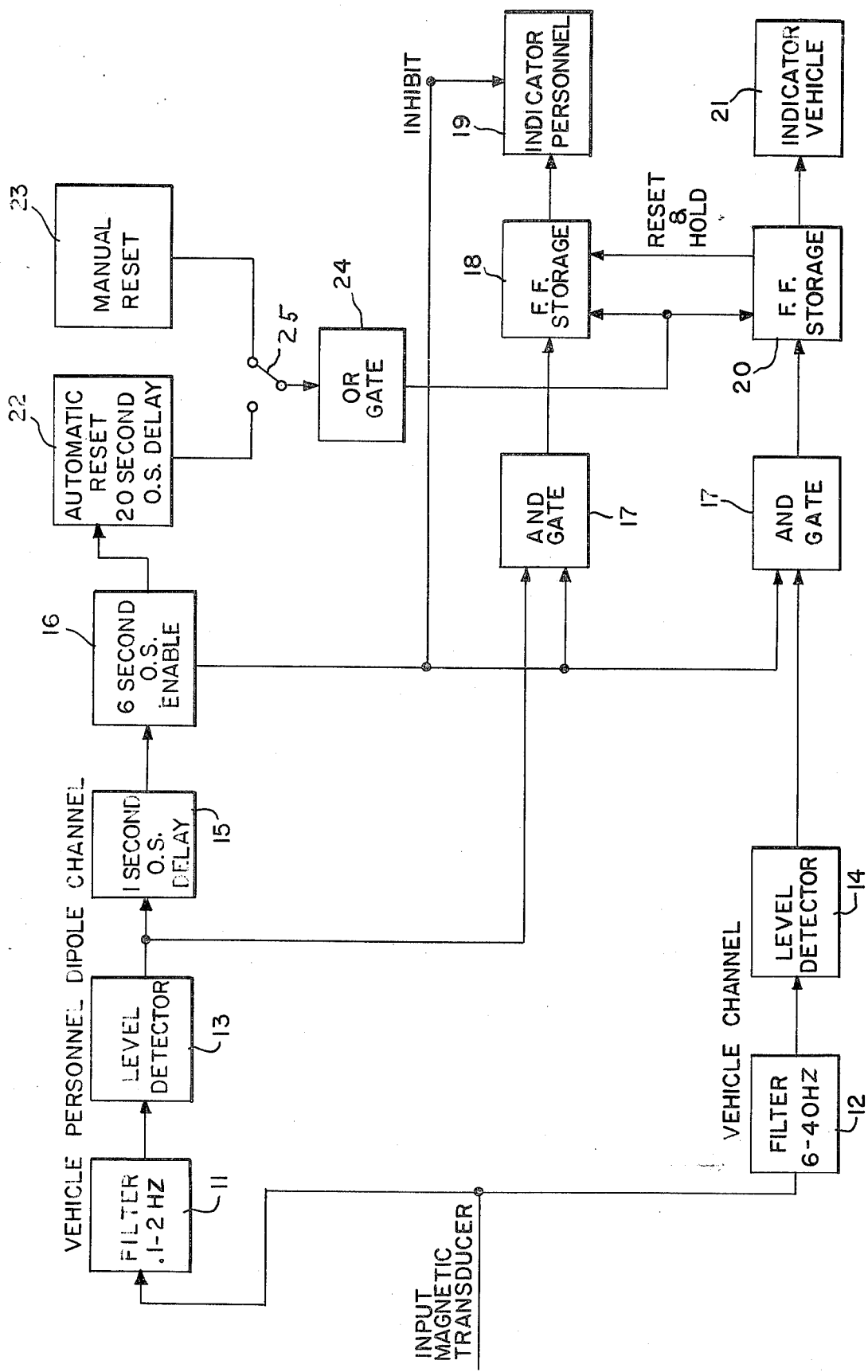

A MAGNETIC SYSTEM FOR DISCRIMINATING BETWEEN VEHICLES AND PERSONNEL BASED UPON THEIR CHARACTERISTIC FREQUENCY SIGNATURES

The invention described herein may be manufactured, used, and licensed by or for the Government for Governmental purposes without the payment to me of any royalties thereon.

BACKGROUND OF THE INVENTION

This disclosure relates generally to a monitoring system which can be used by a military commander to provide information on enemy capabilities. In particular, the system provides information on the type of enemy target in a remote location. By determining whether a target is a vehicle such as a tank or personnel such as a rifleman, a commander can determine the extent of any threat and take appropriate action.

In the past such information had to be obtained by the use of a local observer who was subject to enemy capture or attack. In addition, if an area was extremely large, the use of service personnel for monitoring became impracticable.

Previous monitoring systems attempted to solve these problems, but used only the lower frequencies generated by target objects and failed to differentiate between various objects. The present invention remedies previous drawbacks by utilizing both the lower and upper frequencies of the target signature.

SUMMARY OF THE INVENTION

This classifier performs its detection and classification function on the basis of signal amplitude and frequency content. The detection function is performed by level comparator circuits which detect signals that exceed the ambient background level by approximately 6DB. Classification on the basis of frequency content is made possible by differences in the spectral characteristics of vehicles versus personnel magnetic signature. The predominant characteristic of the magnetic transducer output produced either by a vehicle or a person with arms or other metallic objects, is a strong dipole signal caused by distortions in the local magnetic field as a magnetic mass moves in the vicinity of the sensor. The frequency of this signal is approximated by the formula: $f = .5v/d$ Velocity (v) is the speed of the magnetic mass and d is its distance in feet from the magnetic transducer. By substituting practical velocities and distances into this formula, it is shown that personnel carrying metallic objects generate frequencies on the order of a few tenths of a Hz while vehicles generate dipole frequencies from a few tenths of a Hz to more than a Hz. Since there is considerable overlap in the dipole frequency range of vehicles and personnel, it alone cannot be used for reliable classification. Further analysis of the magentic signature of vehicles reveals the existence of higher frequency components due to the rapid mechanical motion of various metallic vehicle parts such as the motor, wheels (or treads), axles, drive shaft, gears, etc. Field tests with various vehicles indicate that the optimum bandwidth for these signals is in the range of 6 to 40 Hz. Since this range is considerably higher than the frequencies generated by personnel, the existence of frequencies in this range in a magnetic signature is a positive vehicle indicator. Field tests with armed personnel indicate that the optimum bandwidth for the dipole signal generated is 0.1 to 2 Hz. By designing a system to process these two frequency ranges, a highly effective classifier is realized since personnel will generate signals only in the low frequency range and vehicles will always generate signals in both ranges.

The primary object of the invention therefore is to provide an improved electronic monitoring system which is capable of distinguishing between vehicles and personnel.

A further object of the invention is to provide a monitoring system which can transmit such information from a remote location via a data link.

These and other objects of the invention are achieved by the use of magnetic transducers at the remote location. Signals from these transducers are analyzed for their frequency content by analog and logic circuits.

BRIEF DESCRIPTION OF THE DRAWING

The exact nature of the invention will become apparent from consideration of the following specification relating to the annexed drawing in which the signal FIGURE shows a block diagram of a preferred embodiment of the invention.

DETAILED DESCRIPTION OF THE INVENTION

Referring now to the drawing, there is shown in the single FIGURE a low pass filter 11 which has a bandwidth of 0.1 to 2 Hz and a high pass filter 12 with a bandwidth of 6 to 40 Hz. Since field tests indicate that a vehicle magnetic signature is in the 6 to 40 Hz. range and personnel magnetic signatures are in the 0.1 to 2 Hz. range, the system is designed to process these two frequency ranges. The input filters are followed by level detectors 13 and 14 which are adjusted so that a signal approximately twice the background noise produces output pulses. Since both vehicles and personnel generate a low frequency signal in the dipole channel, this signal is used to initiate the detection and classification cycle by triggering a one-second single-shot multivibrator 15. The purpose of 15 is to prevent false readings due to random noise transients by providing a one-second setting period before enabling a six-second detection and classification cycle by means of the circuit shown at 16. The timing cycle is chosen so that two threshold crossings occur within the velocity ranges of vehicle and personnel. At the beginning of the 6 second detection and classification cycle, both channel AND gates 17 are enabled and at the same time the personnel indicator is inhibited to prevent an erroneous personnel indication that would result if a vehicle triggered the dipole channel in advance of the vehicle high frequency channel. At the end of 6 seconds, if neither channel has been activated (a second threshold crossing), no indication will be produced; however if only the dipole channel has been activated, the dipole channel storage flip-flop 18 will be set and at the end of six seconds the personnel indicator 19 will activate. If both channels are activated during the six-second period, the vehicle storage flip-flop 20 will be set causing vehicle indicator 21 to activate and at the same time resetting and holding the personnel flip-flop 18 to prevent a personnel indication. After an indication has been made, the classifier may be reset manually by 23 or automatically by twenty second delay 22 by selection of a manual switch 25.

In the event that remote indication is desired, a data link interface would replace indicators 19 and 21 as part of the data transfer cycle.

It should be understood that the above described embodiment is illustrated to explain the principle of this invention and that numerous alterations and modifications may be made without departing from the true spirit and scope of the invention as set forth in the claims.

What is claimed is:

1. A moving object detector and discriminating system which indicates the presence of vehicles and persons and differentiates therebetween comprising:

a first channel means for indicating the presence of a moving vehicle including first bandpass filter input means adapted to pass an input signal having a frequency within a first selected frequency range; a first level detector electrically connected to said first bandpass filter input means, said first level detector having a selected threshold level and adapted to block signals of lesser amplitude and to pass signals having an amplitude at said threshold level and above; a moving vehicle presence indicator; and first channel interconnection means adapted to interconnect the output of said first level detector to said moving vehicle presence indicator to activate same;

a second channel means for indicating the presence of a moving person including second bandpass filter input means adapted to pass an input signal having a frequency within a second selected frequency range; a second level detector electrically connected to said second bandpass filter input means, said second level detector having a selected threshold level and adapted to block signals of lesser amplitude and to pass signals at said threshold level and above; a moving person presence indicator and second channel interconnection means adapted to interconnect the output of said second level detector to said moving person presence indicator to activate same;

means for simultaneously applying an input signal, having frequency characteristics representative of the presence of moving objects of the vehicle and person variety, to said first and second channel means;

and channel interrupter means adapted to block passage of the output signal of said second level detector to said moving person presence indicator, said channel interrupter means being responsive to the simultaneous occurence of output signals from said first and second level detectors.

2. A moving object detector and discriminating system as defined in claim 1 wherein:

said first selected frequency range of said first bandpass filter is 6 to 40 hertz, and said second selected frequency range of said second bandpass filter is 0.1 to 2 hertz.

3. A moving object detector and discriminating system as defined in claim 2 wherein:

said first channel interconnector means includes at least one AND gate; and the output of said first and second level detectors are connected to the inputs of an AND gate in said first channel interconnection means such that said moving vehicle presence indicator is activated in response to the simultaneous occurrence of output signals from said first and second level detectors.

* * * * *